(12) United States Patent
Ogawa et al.

(10) Patent No.: US 8,195,847 B2
(45) Date of Patent: Jun. 5, 2012

(54) STORAGE CONTROL APPARATUS, STORAGE SYSTEM AND METHOD

(75) Inventors: Yuichi Ogawa, Kawasaki (JP); Tsukasa Makino, Kawasaki (JP); Tomoaki Tsuruta, Kawasaki (JP); Hiroaki Ochi, Kawasaki (JP); Marie Abe, Kawasaki (JP); Naohiro Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/049,203

(22) Filed: Mar. 16, 2011

(65) Prior Publication Data

US 2011/0246687 A1    Oct. 6, 2011

(30) Foreign Application Priority Data

Mar. 31, 2010 (JP) ................................. 2010-084363

(51) Int. Cl.
    *G06F 13/36* (2006.01)
(52) U.S. Cl. .......................................... 710/35; 710/36
(58) Field of Classification Search .................. None
    See application file for complete search history.

(56) References Cited

U.S. PATENT DOCUMENTS

| | | | | |
|---|---|---|---|---|
| 6,167,486 A * | 12/2000 | Lee et al. | ........................ | 711/120 |
| 6,859,901 B2 * | 2/2005 | Lee | ........................ | 714/718 |
| 7,593,263 B2 * | 9/2009 | Sokolov et al. | ........................ | 365/185.17 |
| 2007/0204075 A1 * | 8/2007 | Rajan et al. | ........................ | 710/22 |
| 2008/0320214 A1 * | 12/2008 | Ma et al. | ........................ | 711/103 |
| 2009/0196102 A1 * | 8/2009 | Kim | ........................ | 365/185.11 |
| 2009/0292865 A1 * | 11/2009 | Hong | ........................ | 711/103 |
| 2010/0082879 A1 * | 4/2010 | Mckean et al. | ........................ | 711/103 |
| 2010/0199036 A1 * | 8/2010 | Siewert et al. | ........................ | 711/112 |
| 2011/0035548 A1 * | 2/2011 | Kimmel et al. | ........................ | 711/114 |

FOREIGN PATENT DOCUMENTS

JP    2000-187559    7/2000

* cited by examiner

*Primary Examiner* — Cheng-Yuan Tseng
(74) *Attorney, Agent, or Firm* — Staas & Halsey LLP

(57) ABSTRACT

A storage control apparatus for transmitting data to and receiving data from a plurality of storage devices connected to the same interface, the storage control apparatus includes a memory configured to store a management table registering a burst transfer length of each of the plurality of storage devices, the plurality of storage devices including a first storage device having a first burst transfer length that is a minimum in the management table and a second device having a second burst transfer length; an adjusting controller configured to adjust the second burst transfer length in input and/or output processing if the second burst transfer length registered in the management table is different from the first burst transfer length; and a data transfer controller configured to issue a command for a data transfer to the second storage device on the basis of the adjusted second burst transfer length.

20 Claims, 18 Drawing Sheets

FIG.3A  182

| DRIVE | 1 (HDD51) | 2 (HDD52) | 3 (HDD53) | 4 (HDD54) | 5 (HDD55) | 6 (HDD56) | 7 (HDD57) | 8 (SSD60) |
|---|---|---|---|---|---|---|---|---|
| BURST TRANSFER LENGTH (KB) | 128 | 128 | 128 | 128 | 128 | 128 | 128 | 32 |

FIG.3B  183

| DRIVE | 1 (HDD51) | 2 (HDD52) | 3 (HDD53) | 4 (HDD54) | 5 (HDD55) | 6 (HDD56) | 7 (HDD57) | 8 (SSD60) |
|---|---|---|---|---|---|---|---|---|
| BURST TRANSFER LENGTH (KB) | 32 | 32 | 32 | 32 | 32 | 32 | 32 | 32 |

FIG.8

| DRIVE | 1 (HDD81) | 2 (HDD82) | 3 (HDD83) | 4 (HDD84) | 5 (HDD85) | 6 (HDD86) | 7 (HDD87) | 8 (SSD90) |
|---|---|---|---|---|---|---|---|---|
| BURST TRANSFER LENGTH (KB) | 128 | 64 | 64 | 64 | 64 | 64 | 64 | 32 |

| DRIVE | 1 | 2 | 3 | 4 | 5 | 6 | 7 | 8 |
|---|---|---|---|---|---|---|---|---|
| BURST TRANSFER LENGTH (KB) | 128 | 64 | 64 | 64 | 64 | 64 | 64 | 32 |
| ESTIMATED RESPONSE TIME (SECOND) | 0.75 | 1.5 | 1.5 | 1.5 | 1.5 | 1.5 | 1.5 | 3.0 |

⇒ THE REGISTERED BURST TRANSFER LENGTH IS CHANGED

186

| DRIVE | 1 | 2 | 3 | 4 | 5 | 6 | 7 | 8 |
|---|---|---|---|---|---|---|---|---|
| BURST TRANSFER LENGTH (KB) | 64 | 64 | 64 | 64 | 64 | 64 | 64 | 32 |
| ESTIMATED RESPONSE TIME (SECOND) | 1.0 | 1.0 | 1.0 | 1.0 | 1.0 | 1.0 | 1.0 | 2.0 |

FIG. 12A — 191

| DRIVE | 1 | 2 | 3 | 4 | 5 | 6 | 7 | 8 |
|---|---|---|---|---|---|---|---|---|
| CURRENT BURST TRANSFER LENGTH (KB) | 64 | 64 | 64 | 64 | 64 | 64 | 64 | 32 |
| NUMBER OF I/Os | 100 | 100 | 100 | 100 | 10 | 10 | 10 | 5 |

FIG. 12B — 192

| DRIVE | 1 | 2 | 3 | 4 | 5 | 6 | 7 | 8 |
|---|---|---|---|---|---|---|---|---|
| CURRENT BURST TRANSFER LENGTH (KB) | 64 → 128 | 64 | 64 | 64 | 64 | 64 | 64 | 32 |
| NUMBER OF I/Os | 100 | 100 | 100 | 100 | 10 | 10 | 10 | 5 |
| ESTIMATED RESPONSE TIME | 0.75 | 1.5 | 1.5 | 1.5 | 1.0 | 1.0 | 1.0 | 1.5 |

FIG. 12C — 193

| DRIVE | 1 | 2 | 3 | 4 | 5 | 6 | 7 | 8 |
|---|---|---|---|---|---|---|---|---|
| CURRENT BURST TRANSFER LENGTH (KB) | 128 → 64 | 64 | 64 | 64 | 64 | 64 | 64 | 32 |
| NUMBER OF I/Os | 100 | 100 | 100 | 100 | 100 | 100 | 100 | 100 |
| ESTIMATED RESPONSE TIME | 1.0 | 1.0 | 1.0 | 1.0 | 1.0 | 1.0 | 1.0 | 2.0 |

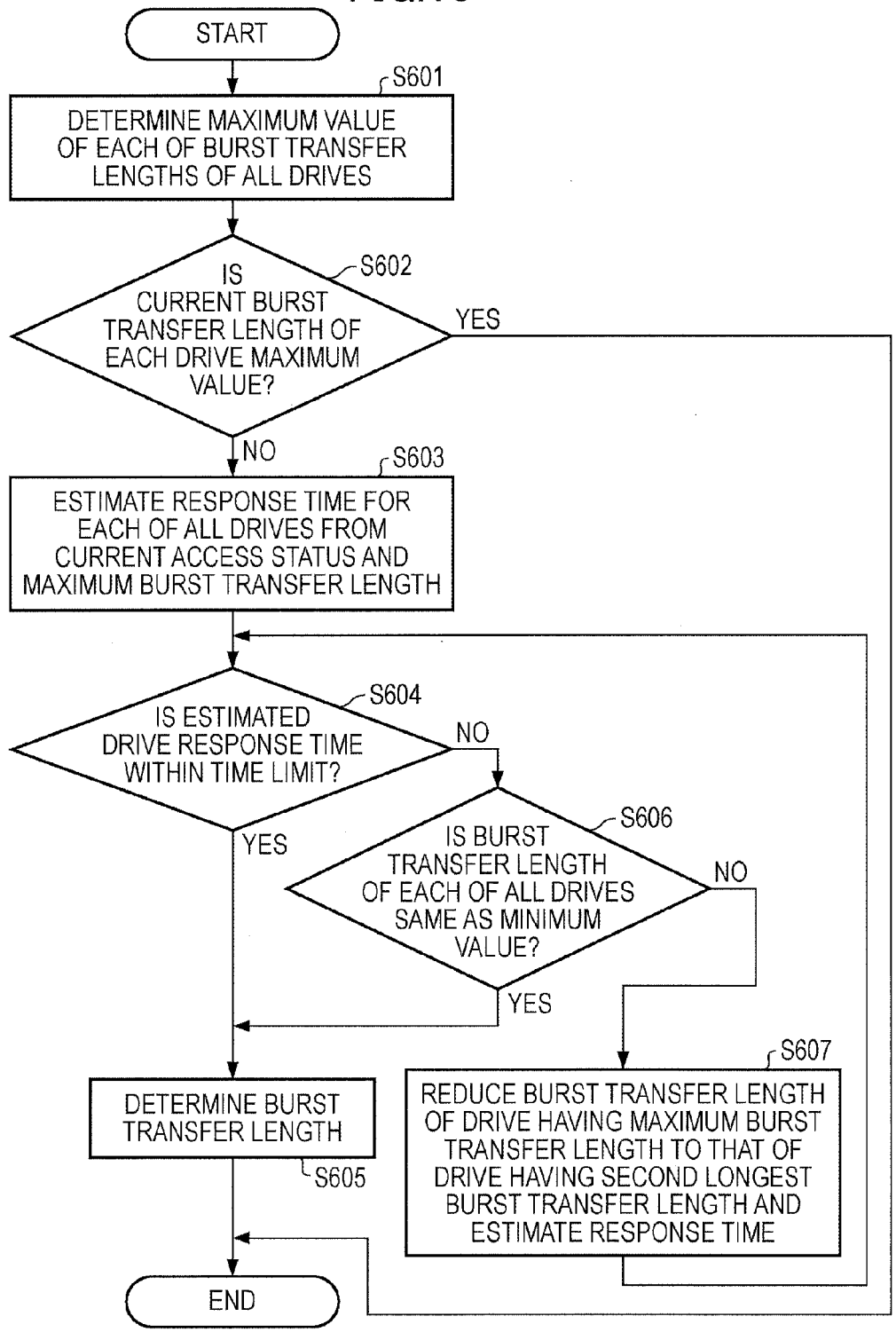

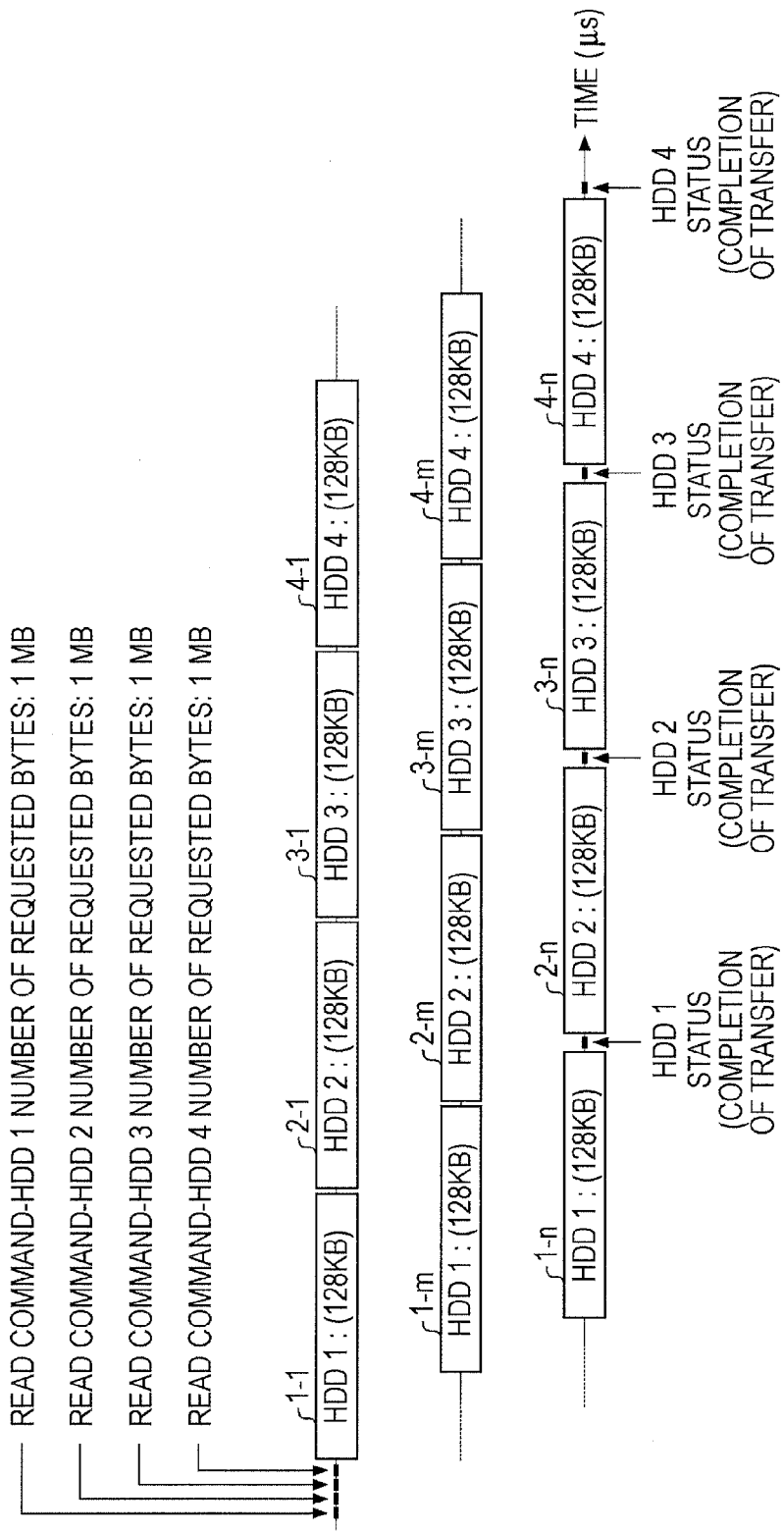

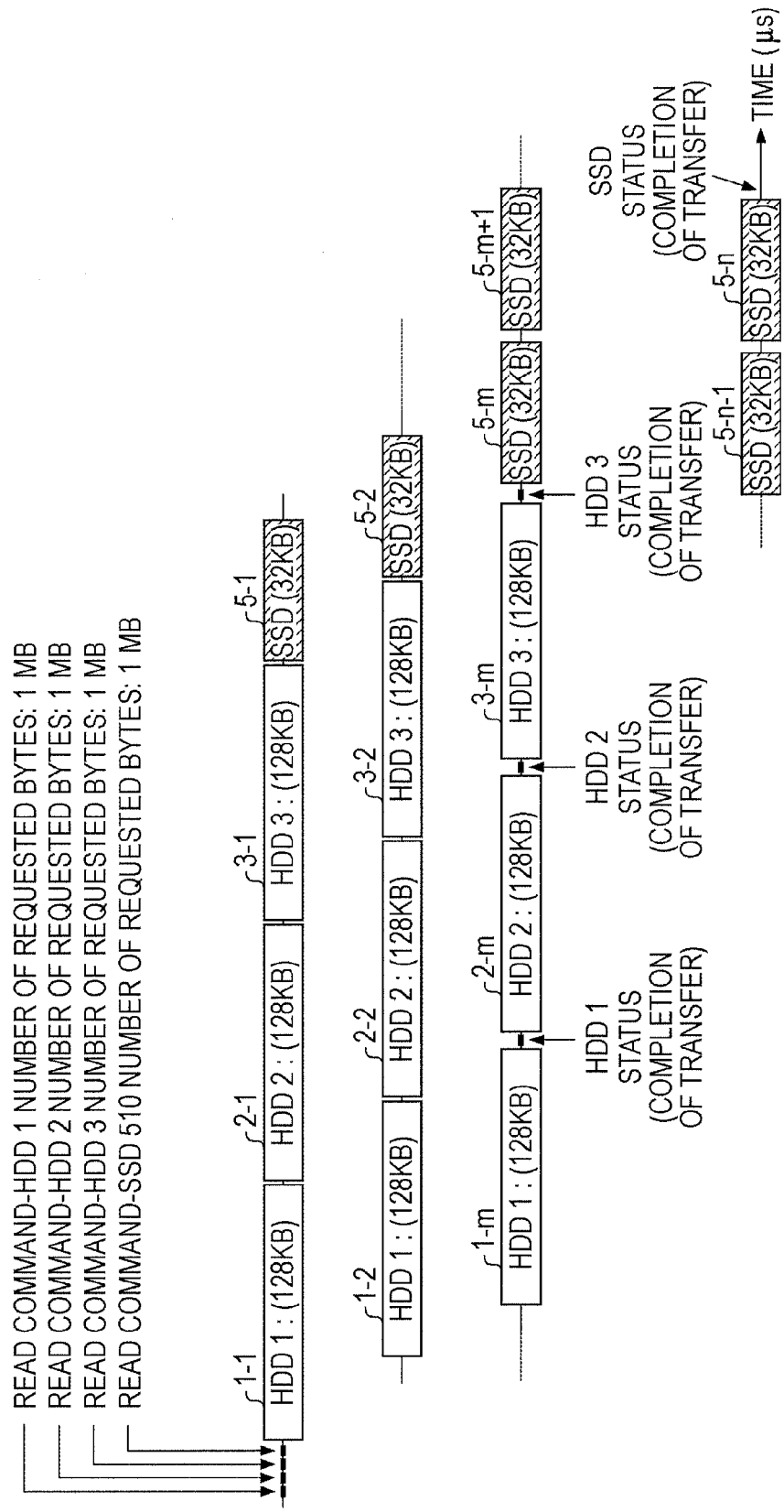

STORAGE CONTROL APPARATUS, STORAGE SYSTEM AND METHOD

CROSS-REFERENCE TO RELATED APPLICATION

This application is based upon and claims the benefit of priority of the prior Japanese Patent Application No. 2010-84363, filed on Mar. 31, 2010, the entire contents of which are incorporated herein by reference.

FIELD

The embodiments discussed herein are related to a storage control apparatus, a storage system and a storage control method.

BACKGROUND

FIG. 15 illustrates a computer system including a storage system. A computer system 100 includes a host 200 of a server or a computer system and a storage system 300.

The storage system 300 forms redundant array independent disks (RAID) for storage devices, such as magnetic disk devices (HDDs), thereby enhancing redundancy of data and providing the host 200 with desired performance characteristics.

Modules of the storage system 300 are described below. A controller module (CM) 400 includes a host interface 401 for controlling an interface with the host 200.

When receiving an operation request to write/read data from the host 200, the host interface 401 notifies a central processing unit (CPU) 402 of a processing request. The host interface 401 accesses a cache memory on the CM 400 and transfers data between the storage system 300 and the host 200.

The CM 400 is a control module that is the core of all modules of the storage system 300. The CM 400 further includes a memory 403. The memory 403 is used for management of allocation and management of a cache memory in overall control. The CM 400 provides various services by controlling the CPU 402 using software.

A drive set 500 includes a plurality of drives containing magnetic disk devices (HDDs) 1 to 7 and a solid state drive (SSD) 510. A device interface (DI) 405 is a module for use in communication with the drive set 500. The DI 405 is interface-connected to a fibre channel (FC) cable 410 for communication with the drive set 500.

The CM 400 controls the fibre channel interface for use in communication with the drive set 500, controls input to and output from the drive set, and performs RAID control by using the DI 405 incorporated therein.

Each of the DI 405, which is an initiator, and the HDDs and the SSD 510 of the drive set 500 has a fibre channel (FC) port, and the FC ports form an arbitrated loop with the FC cable 410 and are connected to each other.

An arbitrated loop is one of the fibre channel connection modes, and it connects a plurality of FC ports in a loop shape and allows communication between one pair of ports among them. The arbitrated loop may be able to connect 127 devices at the maximum.

Input/output (I/O) processing using burst transfer of a storage device, such as HDD, is discussed. Here, burst transfer is one technique for enhancing the speed of data transfer and is means for enhancing a transfer speed by omitting part of a procedure, for example, addressing, in transferring continuous data.

A burst transfer length is the amount of data capable of being transferred at a time to a storage device (drive) in burst transfer. If the size of data to be transferred is larger than the burst transfer length, the storage device transfers the data in multiple portions. It is generally assumed that the speed of transferring data increases with an increase in the burst transfer length.

FIG. 16 illustrates command processing performed by the CPU on the HDDs. I/O processing using burst transfer of the HDDs 1 to 4 is described as one example. The CM 400 receives read commands 1 to 4 from the host and transfers the commands to the HDDs 1 to 4 through the DI 405. As illustrated in FIG. 15, because the plurality of HDDs shares the serial bus, a bus occupation time at a time is previously set for each HDD.

The I/O processing using burst transfer accesses data in units of burst transfer length. Therefore, the number of data transfer events increases with an increase in the amount of data to the HDDs 1 to 4.

As illustrated in FIG. 16, if a plurality of data transfer events occur, for example, there is a gap between the read data transfer events 1-1 and 1-2 of the HDD 1. In this gap, the read data transfer events 2-1, 3-1, and 4-1 of other HDDs 2 to 4 occur. Subsequently, the read data transfer event 1-2 of the HDD 1 occurs, and the read data transfer events 2-2, 3-2, and 4-2 of the HDDs 2 to 4 occur in the gap between the read data transfer events 1-2 and 1-3.

Accordingly, because, in data transfer using a serial bus shared by a plurality of drives, I/O processing that each drive intends to perform has to wait, the I/O processing is delayed, in comparison with that occurring in data transfer using a serial bus occupied by a single drive.

FIG. 17 is a timing chart that illustrates how the bus is occupied when the drives have the same burst transfer length. When the CPU 402 issues a read request of the same 1 MB to each of the HDDs 1 to 4, the read data elements 1-1 to 4-1 of the respective HDDs 1 to 4 are transferred in units of 128 KB. After that, the read data elements 1-2 to 4-2, 1-3 to 4-3, 1-$n$ to 4-$n$ are transferred in sequence.

When the drives have the same bus occupation time, the drives are possible to equally complete command processing, and the host 200 does not recognize differences in performances among the drives. Accordingly, when all the drives have the same burst transfer length, their bus occupation times are the same and the performance values of the drives are also the same.

However, burst transfer lengths may vary depending on the type of a drive, such as HDD or SSD. FIG. 18 is a timing chart that illustrates how the bus is occupied when there is a drive having a different burst transfer length. In this case, the SSD 510 has a burst transfer length of 32 KB, and each of the HDDs 1 to 3 has a burst transfer length of 128 KB. Accordingly, the SSD 510 and each of the HDDs 1 to 3 have different bus occupation times.

As illustrated in FIG. 18, when the CPU 402 issues a read request of 1 MB to each of the HDDs 1 to 3 and the SSD 510, the read data elements 1-1, 2-1, and 3-1 of the respective HDDs 1 to 3 and the read data element 5-1 of the SSD 510 are transferred in succession. Each of the read data elements of the HDDs 1 to 3 is transferred in units of 128 KB, and the read data element of the SSD 510 is transferred in units of 32 KB.

After that, the read data elements 1-2 to 5-2, 1-3 to 5-3, . . . , 1-$m$ to 5-$m$ are transferred in sequence. Subsequently, the remaining read data elements 5-$m$+1 to 5-$n$ of the SSD 510 are collectively transferred. That is, it takes time to transfer the remaining, and only the SSD completes the command late. Therefore, the host 200 recognizes the SSD as having degraded performance.

Thus, because the SSD 510 has a short burst transfer length and its bus occupation time is short, its response time is longer than that of each of the other HDDs 1 to 3. Depending on the response time, a timeout may occur in command processing at the host side.

The time for which a storage device occupies a bus is determined by the maximum value of the amount of transfer at a time possessed by the storage device, that is, the maximum value of the burst transfer length. The burst transfer length may be changed depending on the settings in the storage device; but it is difficult to change the burst transfer length if it is uniquely determined.

Accordingly, when a single serial bus is used as a path, if storage devices have different burst transfer lengths, there is a problem that the performance of a storage device with a short burst transfer length is degraded by the effects of a storage device with a long burst transfer length. This is a cause of degraded overall system performance and decreased reliability.

Under cloud computing environment, if such degradation in performance of a storage device occurs, a user is unable to grasp situations of a storage system, and reliability of the overall storage system is decreased.

SUMMARY

According to an aspect of the embodiment, a storage control apparatus for transmitting data to and receiving data from a plurality of storage devices connected to the same interface, the storage control apparatus includes a memory configured to store a management table registering a burst transfer length of each of the plurality of storage devices, the plurality of storage devices including a first storage device having a first burst transfer length that is a minimum among the burst transfer lengths registered in the management table and a second device having a second burst transfer length; an adjusting controller configured to adjust the second burst transfer length in input and/or output processing to the second storage device if the second burst transfer length registered in the management table is different from the first burst transfer length registered in the management table; and a data transfer controller configured to issue a command for a data transfer to the second storage device on the basis of the second burst transfer length adjusted by the adjusting controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B illustrate burst transfer length management tables.

FIG. 8 illustrates a burst transfer length management table.

FIG. 10 illustrates how a burst transfer length is adjusted.

FIGS. 12A to 12C illustrate burst transfer length management tables.

FIG. 13 is a flowchart that illustrates a process (part III) of adjustment of a burst transfer length.

FIG. 17 is a timing chart that illustrates occupation of a bus when drives have the same burst transfer length.

FIG. 18 is a timing chart that illustrates occupation of a bus when there is a drive having a different burst transfer length.

DESCRIPTION OF EMBODIMENTS

Preferred embodiments of the present techniques will be explained with reference to accompanying drawings.

Figure 1:
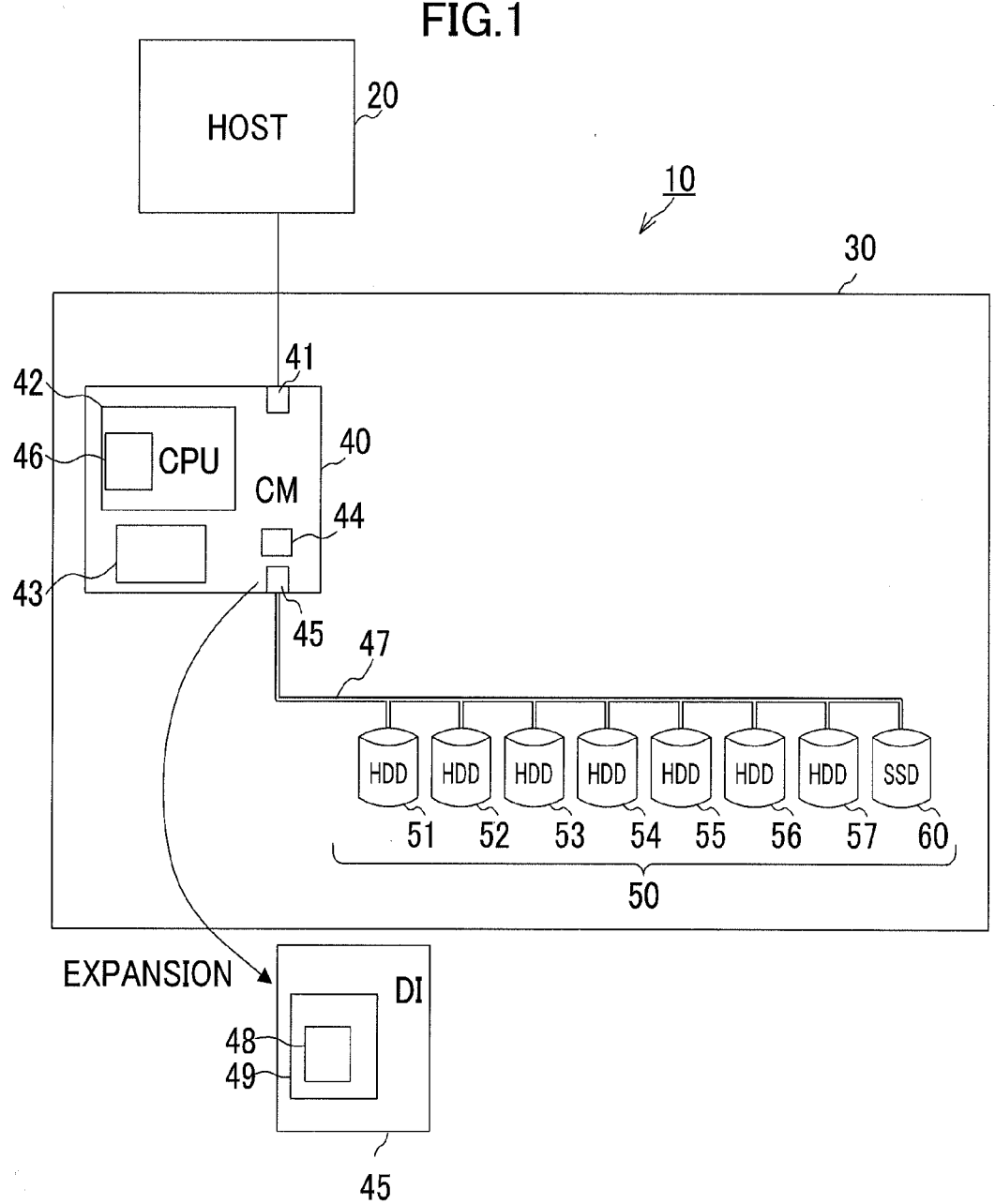
FIG. 1 illustrates a computer system including a storage system according to a first embodiment.

FIG. 1 illustrates a computer system including a storage system. A computer system 10 includes a host 20 and a storage system 30. The storage system 30 is a RAID device that forms RAID for storage devices, such as magnetic disk devices (HDDs), and provides increased data redundancy.

A host interface 41 of a controller module (CM) 40 controls an interface with the host 20. When receiving an operation request to write/read data from the host 20, the host interface 41 notifies a CPU 42 of a processing request. The host interface 41 accesses a cache memory 44, such as dynamic random access memory (DRAM), on the CM 40 and transfers data between the storage system 30 and the host 20.

The CM 40 implements resource management, such as management of resources of modules and effective control management. The CM 40 includes a memory 43 storing various kinds of software and a table for management of a burst transfer length (hereinafter referred to as burst transfer length management table), which is described below. The CM 40 offers various services by controlling the CPU 42 using the software.

The CM 40 has a device interface (DI) 45 incorporated therein. To increase redundancy, the storage system 30 may include a plurality of CMs. Depending on the number of storage devices, a plurality of DIs 45 may be incorporated in the CM 40.

A drive set 50 includes a plurality of storage devices containing magnetic disk devices (HDDs) 51 to 57 and a solid state drive (SSD) 60. The DI 45 is a module for communication with the drive set 50. For the sake of simplification, only the HDDs 51 to 57 and the SSD 60 are illustrated as storage devices in FIG. 1.

The drive set 50 is connected to the CM 40 through a fibre channel (FC) interface 47. The CM 40 performs interface control for communication with the drive set 50, I/O control of the magnetic disk devices, and RAID control.

Each of the DI 45 and the HDDs and SSD of the drive set 50 has an FC port. The FC ports form an arbitrated loop with an FC cable and are connected to each other.

For the present embodiment, an FC interface and an arbitrated loop connection are described as an example. However, other forms are applicable. For example, a serial interface, such as serial attached SCSI (SAS) or serial advanced technology attachment (SATA), may be used.

A burst transfer length detection circuit 48 and a data transfer control circuit 49 are disposed in the DI 45. A burst transfer length adjusting unit 46 in the CPU 42 changes the settings of a burst transfer length in I/O processing in each storage device. The burst transfer length adjusting unit 46 is an example of an adjusting controller. With this, the data transfer control circuit 49 adjusts the amount of data to be transferred at a time of each storage device on the bus in I/O processing. The data transfer control circuit 49 is an example of a data transfer controller.

The burst transfer length detection circuit 48 is an example of a detector. The burst transfer length detection circuit 48 functions as bus occupation status detecting means for detecting an estimated bus occupation status and detects a burst transfer length of each storage device in I/O processing. This detection enables detection of an estimated bus occupation status of each storage device (e.g., bus occupation time, bus occupation ratio).

The burst transfer length detection circuit 48 detects a burst transfer length of each of the storage devices connected on the same bus in I/O processing using a system diagnosis command of the burst transfer length adjusting unit 46.

Figure 2:
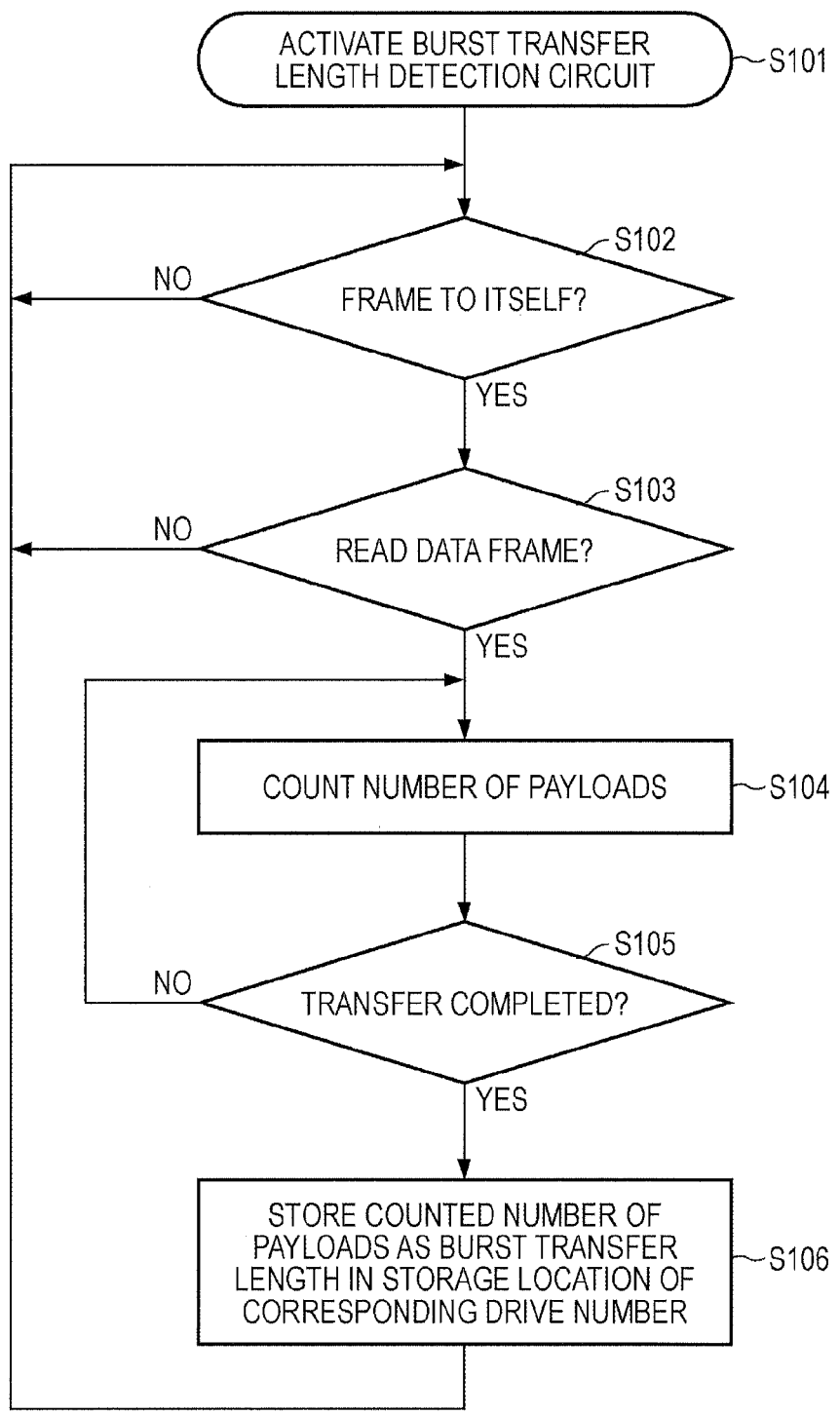
FIG. 2 is a flowchart for describing how a burst transfer length is detected.

FIG. 2 is a flowchart for describing how a burst transfer length is detected. The burst transfer length adjusting unit 46 activates the burst transfer length detection circuit 48 in the DI 45 (S101). The DI 45 determines whether a frame is transferred to itself (S102). If it is transferred to itself (YES in S102), the DI 45 determines whether the frame is a read data frame (S103).

If it is a read data frame (YES in S103), the burst transfer length detection circuit 48 counts the number of payloads (number of actual data elements in the frame) (S104). It is determined whether the transfer has been completed (S105). If it has been completed (YES in S105), the burst transfer length detection circuit 48 stores the counted number of payloads as the burst transfer length in a storage location in its corresponding drive number of a burst transfer length management table 182 illustrated in FIG. 3A.

In FIGS. 3A and 3B, the drives 1 to 8 correspond to the HDDs 51 to 57 and SSD 60 connected on the same bus.

Figure 4:
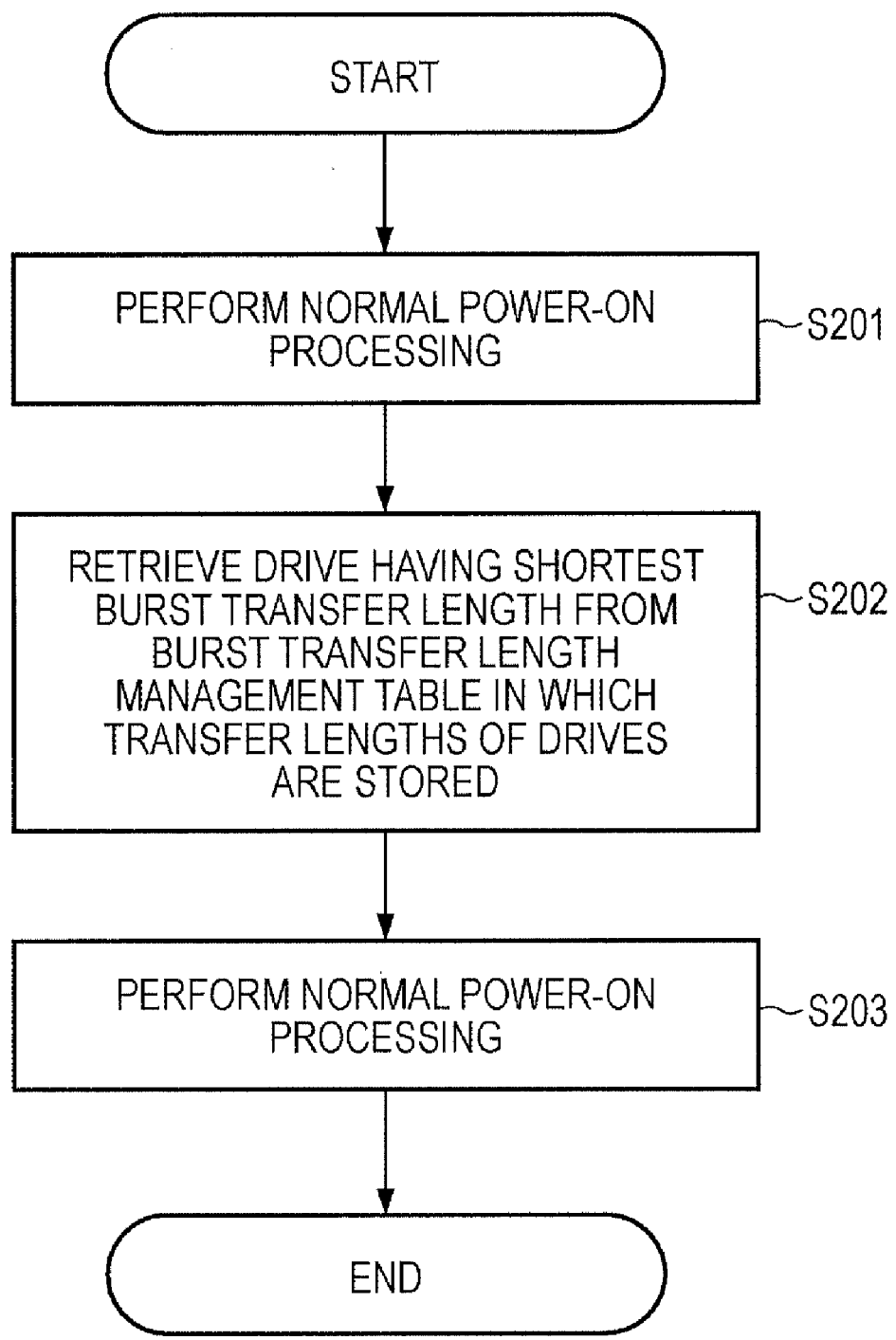
FIG. 4 is a flowchart occurring in system diagnosis.

FIG. 4 is a flowchart occurring in system diagnosis. The system diagnosis is conducted in system power-on processing. The detection of a burst transfer length described in FIG. 2 is executed in the system diagnosis.

The CPU 42 in the storage system 30 performs normal power-on processing (S201). The burst transfer length adjusting unit 46 of the CPU 42 activates the burst transfer length detection circuit 48 and makes the burst transfer length detection circuit 48 execute the processing described in FIG. 2. The burst transfer length detection circuit 48 registers the burst transfer length of each drive in the burst transfer length management table 182.

The burst transfer length adjusting unit 46 retrieves a drive that has the shortest burst transfer length (minimum value) from the burst transfer length management table 182 (S202). Then, the remaining power-on processing continues (S203).

The burst transfer length adjusting unit 46 may detect a burst transfer length every time, when a SSD is contained, or when a storage device is added, instead of once at power-on. Alternatively, the burst transfer length adjusting unit 46 may detect a burst transfer length when a timeout occurs in command processing because of high load on the system.

Figure 5:
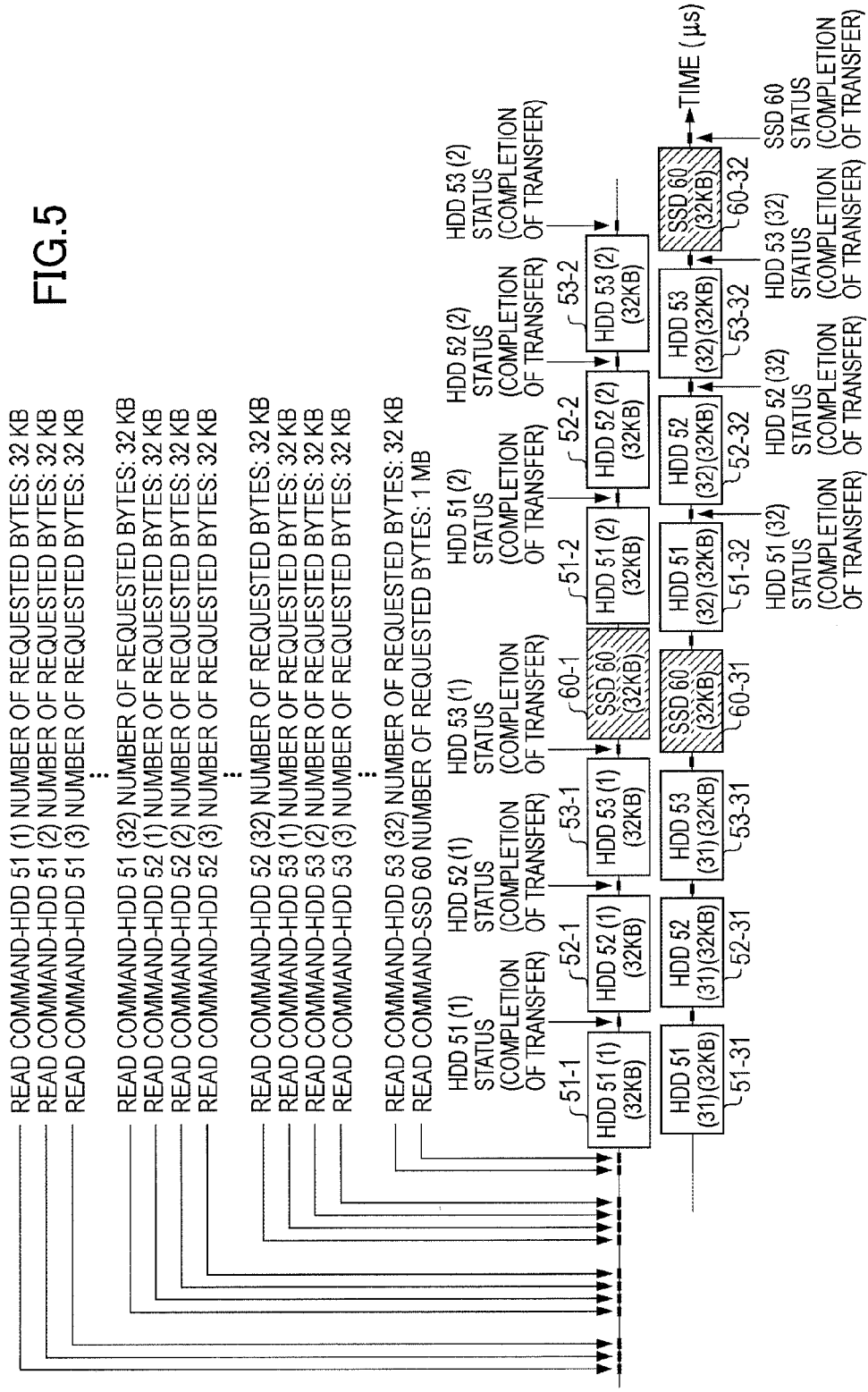
FIG. 5 is a timing chart for describing a bus occupation time of each drive.

FIG. 5 is a timing chart for describing a bus occupation time of each drive. Here, a case in which the CPU 42 issues a read request of 1 MB to each of the HDDs 51 to 53 and SSD 60 is discussed.

The description is provided using an example in which the burst transfer length of each of the HDDs 51 to 53 in I/O processing is 128 KB and that of the SSD 60 is 32 KB as illustrated in the burst transfer length management table 182 of FIG. 3A. That is, the amount of data capable of being transferred on the bus at a time (hereinafter referred to also as the amount of transfer data) of each of the HDDs 51 to 53 is 128 KB, and the amount of transfer data of the SSD 60 is 32 KB.

Accordingly, the SSD 60 and each of the HDDs 51 to 53, to which the read request has been issued, have different burst transfer lengths, and thus have different bus occupation times. Thus, the CPU 42 enables performance optimization of the data transfer control circuit 49.

The burst transfer length adjusting unit 46 creates a burst transfer length management table 183 illustrated in FIG. 3B such that the burst transfer length of each of the HDDs 51 to 53 is 32 KB, which is the same as that of the SSD 60 and the minimum value of the drives. The data transfer control circuit 49 refers to the burst transfer length management table 183 and issues a command.

The data transfer control circuit 49 adjusts the read command from the CPU 42 such that the burst transfer length of each of the HDDs 51 to 53 becomes equal to the minimum value, which is the burst transfer length of the SSD 60.

As illustrated in FIG. 5, when the CPU 42 issues a read command of the number of requested bytes of 1 MB to the SSD 60, because the burst transfer length of the SSD 60 is 32 KB, 32 data transfer events occur.

Accordingly, the data transfer control circuit 49 divides the read command of the number of requested bytes of 1 MB for each of the HDDs 51 to 53 in a similar manner such that its burst transfer length is 32 KB and 32 data transfer events occur. Specifically, as illustrated in FIG. 5, the data transfer control circuit 49 issues 32 commands each having the number of requested bytes of 32 KB in succession to each of the HDDs 51 to 53. This issuance of divisional commands changes the burst transfer length of each of the HDDs 51 to 53 to 32 KB and equalizes the bus occupation times of the HDDs 51 to 53 and SSD 60.

In this way, as illustrated in FIG. 5, the read data elements of the HDDs 51 to 53 and SSD 60 are transferred in units of 32 KB in sequence. After the read data elements 51-1, 52-1, 53-1, and 60-1 of the HDDs 51 to 53 and SSD 60 are transferred in units of 32 KB, the next read data elements 51-2 to 53-2, . . . , 51-32, 52-32, 53-32, and 60-32 are transferred in sequence.

The transferred read data elements obtained by the divisional commands are combined at the cache memory (DRAM) 44, and the combined data reaching a specific amount of data is transferred to the host 20. In the case of write data, when data output from the cache memory 44 reaches a specific amount of data at the data transfer control circuit 49, the data is transferred to each drive through the FC interface 47.

Accordingly, because the bus occupation times of the storage devices are equalized and the process is possible to be equally completed, the level of performance of a storage device having a short burst transfer length may be able to be raised and this is able to make differences in performance among storage devices invisible from the host.

Figure 6:
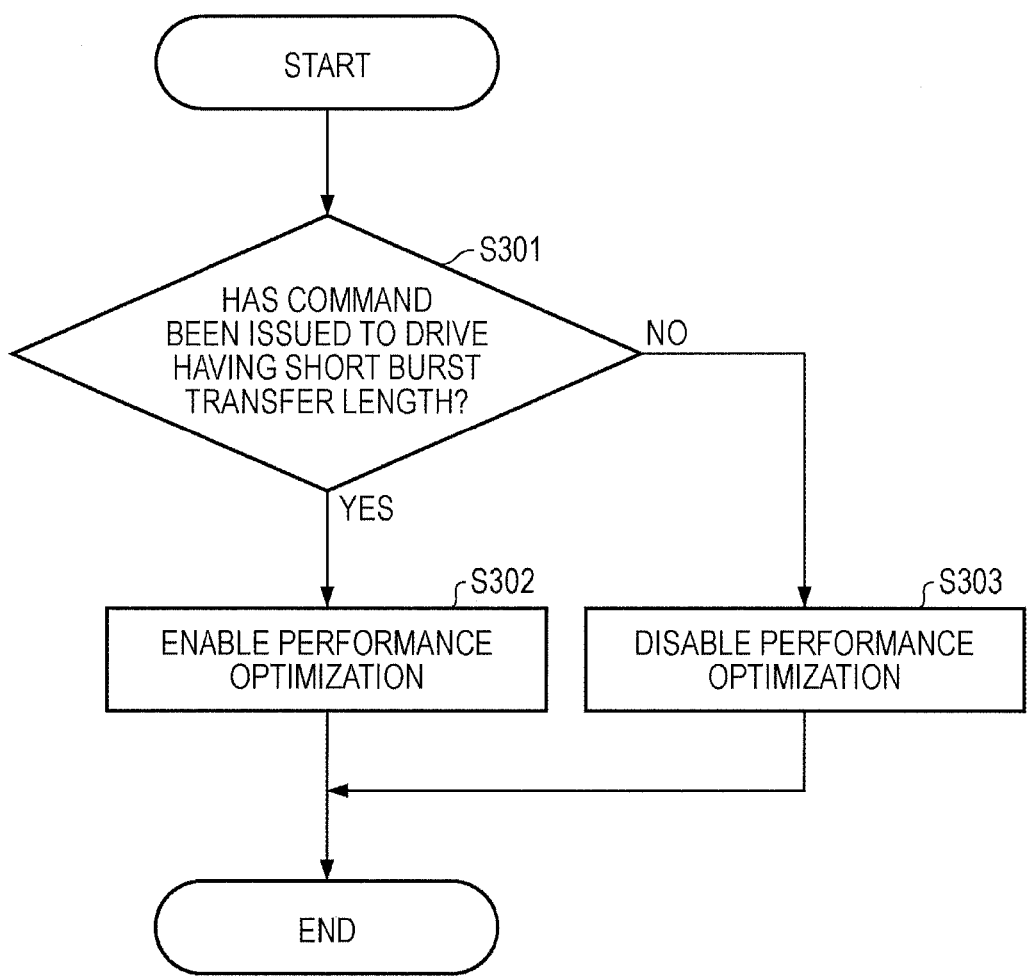
FIG. 6 is a flowchart of determination whether performance optimization is to be carried out.

FIG. 6 is a flowchart of determination whether performance optimization is to be carried out. The performance optimization described above is enabled or disabled by control of the CPU 42 in response to an access status from the CPU 42. First, the CPU 42 determines on the basis of the burst transfer length management table 182 whether an operation request command has been issued from the host 20 to a drive that has a short burst transfer length (S301).

If the request command has been issued (YES in S301), the CPU 42 enables performance optimization of the data transfer control circuit 49 and executes command processing. That is, the data transfer control circuit 49 performs the above-described command division processing (S302).

If no request command has been issued (NO in S301), the CPU 42 disables performance optimization of the data transfer control circuit 49 and executes normal command processing. That is, the data transfer control circuit 49 does not perform the above-described command division processing (S303).

Accordingly, optionally carrying out performance optimization in response to a status of access to each storage device may be able to increase efficiency of processing of a command from a CPU.

For the present embodiment, the CPU 42 detects a burst transfer length and determines whether performance optimization is to be carried out. However, the DI 45 may perform such processing using a processor provided to the DI 45. The burst transfer length management table may be stored in the DI 45 or a memory, such as the cache memory 44.

For the first embodiment, an example in which performances of a plurality of storage devices on the same bus are equalized is illustrated. For a second embodiment, a bus occupation status of each of the storage devices on the same bus is estimated from a command response time, and the maximum value of burst transfer lengths of the storage devices is adjusted. With this method, performance of a storage device that has the minimum burst transfer length may be optimally adjusted. That is, adjustment of burst transfer lengths of a plurality of storage devices on the same bus is unnecessary, and an adjustment process may be able to be simplified.

Figure 7:
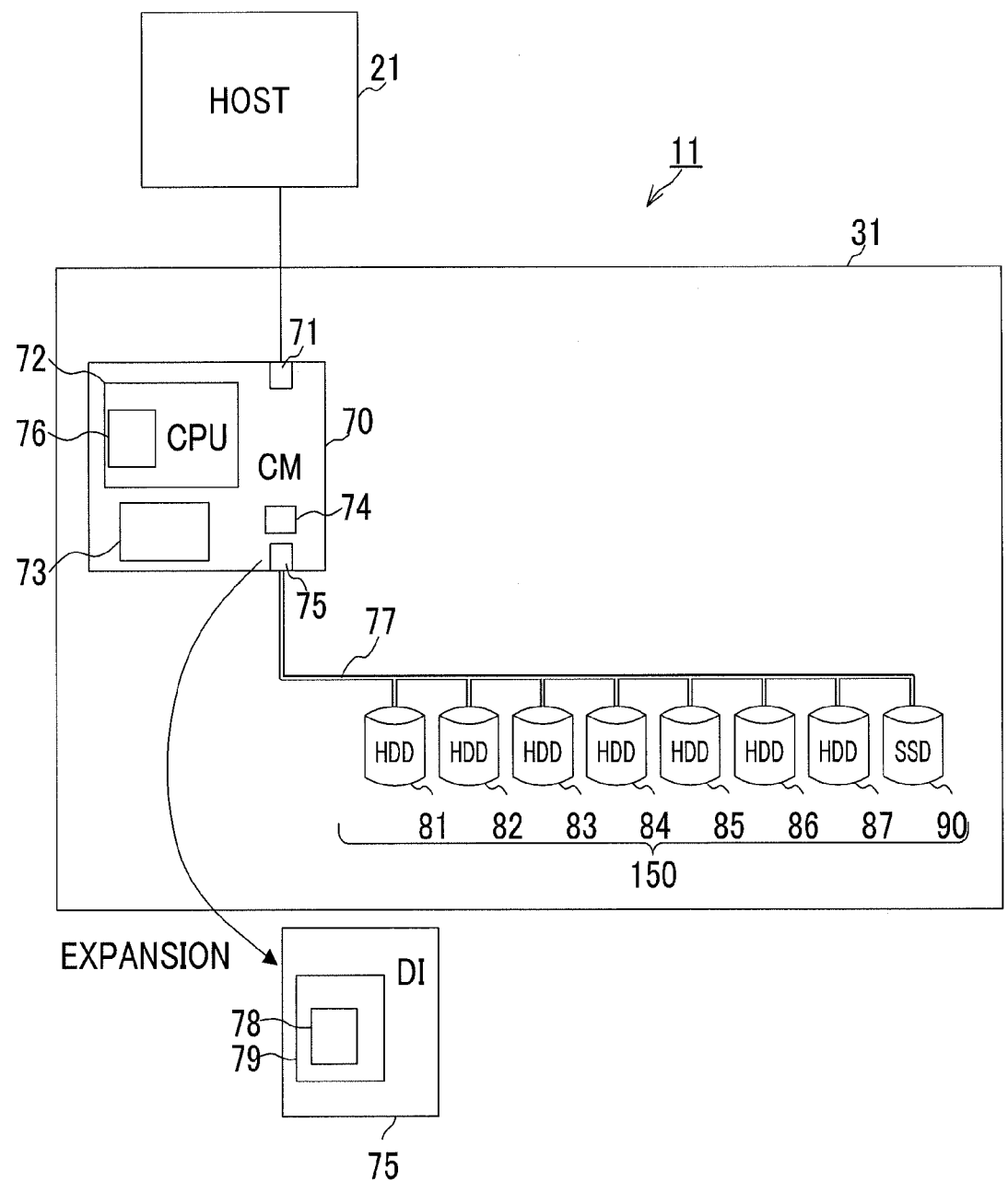
FIG. 7 illustrates a computer system including a storage system according to a second embodiment.

FIG. 7 illustrates a computer system including a storage system according to the second embodiment. A computer system 11 includes a host 21 and a storage system 31. A CM 70 includes a CPU 72, a memory 73, a host interface 71, a DI 75, and a cache memory (DRAM) 74. A data transfer control circuit 79 and an I/O number detection circuit 78 incorporated therein are disposed in the DI 75 of the CM 70. The data transfer control circuit 79 is another example of a data transfer controller.

A drive set 150 includes a plurality of storage devices containing magnetic disk devices (HDDs) 81 to 87 and an SSD 90. The drive set 150 is connected to the CM 70 through an FC interface 77 and the DI 75. For the sake of simplification, only the HDDs 81 to 87 and the SSD 90 are illustrated as storage devices in FIG. 7.

In the CPU 72, a burst transfer length adjusting unit 76 is established by a program. The burst transfer length adjusting unit 76 changes the settings of a burst transfer length in I/O processing in each storage device. With this, the amount of data to be transferred at a time of each storage device on the bus in I/O processing is adjusted.

The burst transfer length adjusting unit 76 has the function of bus occupation status detecting means for detecting an estimated bus occupation status and detects an estimated response time of each storage device. The burst transfer length adjusting unit 76 is another example of an adjusting controller. With this, an estimated bus occupation status (e.g., bus occupation status, bus occupation ratio) is detected.

FIG. 8 illustrates a burst transfer length management table. The memory 73 retains the burst transfer length management table. A burst transfer length management table 184 has the previously registered maximum value of a burst transfer length of each of all drives. The maximum values are registered at the time of system establishment.

For the sake of simplification, only the maximum values of the drives 1 to 8 corresponding to the HDDs 81 to 87 and SSD 90 are illustrated in the burst transfer length management table 184 illustrated in FIG. 8. A case in which the maximum value of the burst transfer length of the drive 1 is 128 KB, that of each of the drives 2 to 7 is 64 KB, and that of the drive 8 is 32 KB is discussed.

Figure 9:
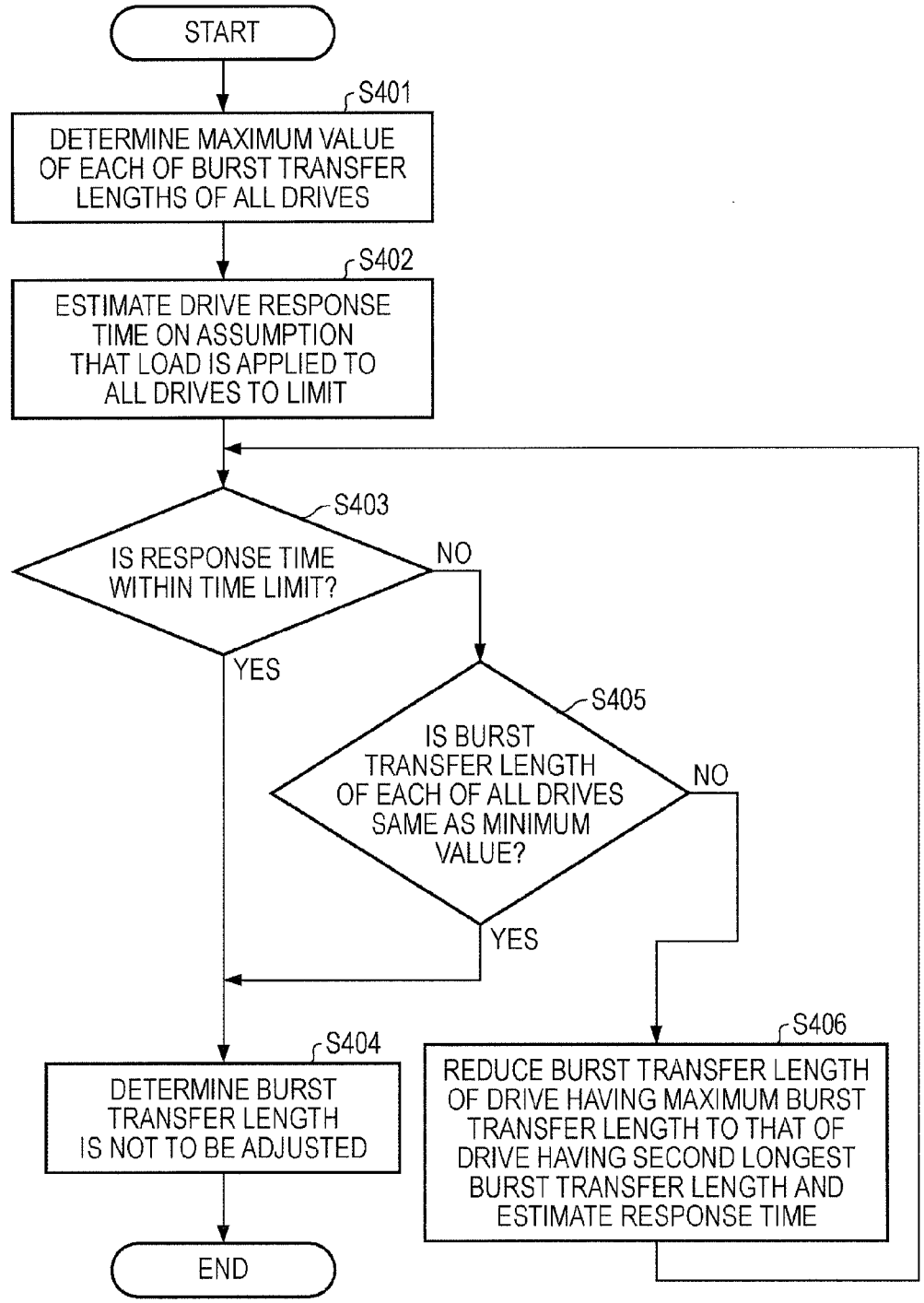
FIG. 9 is a flowchart that illustrates a process (part I) of adjustment of a burst transfer length.

FIG. 9 is a flowchart that illustrates a process (part I) of adjustment of a burst transfer length. First, the burst transfer length adjusting unit 76 of the CPU 72 determines the maximum value of each of the burst transfer lengths of all drives from the burst transfer length management table 184 (S401). The burst transfer length adjusting unit 76 estimates a drive response time on the assumption that a load is applied to all drives to limit (S402).

If the drive response time is within a time limit (YES in S403), the burst transfer length adjusting unit 76 determines that the burst transfer length is not to be adjusted (S404). If the drive response time exceeds the time limit (NO in S403), the burst transfer length adjusting unit 76 determines whether the burst transfer length of each of all drives is the same as the shortest burst transfer length (minimum value) of the maximum values stored in the burst transfer length management table 184 (S405).

If it is the same as the minimum value (YES in S405), the burst transfer length adjusting unit 76 determines that the burst transfer length is not to be adjusted (S404). If it is not the same as the minimum value (NO in S405), the burst transfer length adjusting unit 76 reduces the burst transfer length of a drive having the longest burst transfer length (maximum burst transfer length) of the maximum values stored in the burst transfer length management table to that of a drive having the second longest burst transfer length. Then, the burst transfer length adjusting unit 76 estimates the response time of each of all drives (S406), and the process returns to S403. With this process, the maximum burst transfer length is adjusted in stages.

FIG. 10 illustrates how a burst transfer length is adjusted. Burst transfer length management tables 185 and 186 have drive types, burst transfer lengths, and estimated response times detected by the CPU 72.

In the burst transfer length management table 185, for example, if the time limit of the estimated response time is 2.0 seconds, the response time of the drive 8 is 3.0 seconds, which exceeds 2.0 seconds. In this case, the registered burst transfer length in the burst transfer length management table 185 is changed.

As illustrated in the burst transfer length management table 186, the burst transfer length adjusting unit 76 changes the burst transfer length 128 KB of the drive 1 having the maximum burst transfer length to the second longest 64 KB. The response time of each of all drives is estimated. If the estimated response time of each of all drives is within the time limit, the burst transfer length adjusting unit 76 registers the value at that time as the initial value in the burst transfer length management table.

As a result, the estimated response time of the drive 1 having the maximum burst transfer length is lengthened from 0.75 seconds to 1.0 second, but the estimated response time of the drive 8 having the minimum burst transfer length is shortened from 3.0 seconds to 2.0 seconds. In this way, the estimated response time of each of all drives may be able to be at or below 2.0 seconds.

Accordingly, performance of a storage device having a short burst transfer length and a response speed estimated to be low may be able to be improved. Thus, the difference between performance of a storage device having the maximum value of the burst transfer length and that of a storage device having the minimum value thereof may be able to be reduced, and degradation of performance of an overall system may be able to be avoided.

When performance optimization is enabled, the burst transfer control circuit 79 carries out I/O processing on each storage device using, as the initial value, the burst transfer length stored in the burst transfer length management table to which a result of the performance optimization is reflected. Specifically, a command from the DI 75 to the drive 1 is divided by the burst transfer control circuit 79 such that the burst transfer length is 64 KB, as in the case of the first embodiment.

For example, if a read command of the number of requested bytes of 1 MB is issued from the CPU 72 to the drive 1 (HDD 81), the burst transfer control circuit 79 divides the read command of 1 MB and issues 16 commands each having the number of requested bytes of 64 KB in succession.

The transferred read data elements obtained by the division of the command are combined at the cache memory 74, and the combined data reaching a specific amount of data is transmitted through the host interface 71. In the case of write data, when data output from the cache memory 74 reaches a specific amount of data at the data transfer control circuit 79, the data is transferred to each drive through the FC interface 77.

Figure 11:
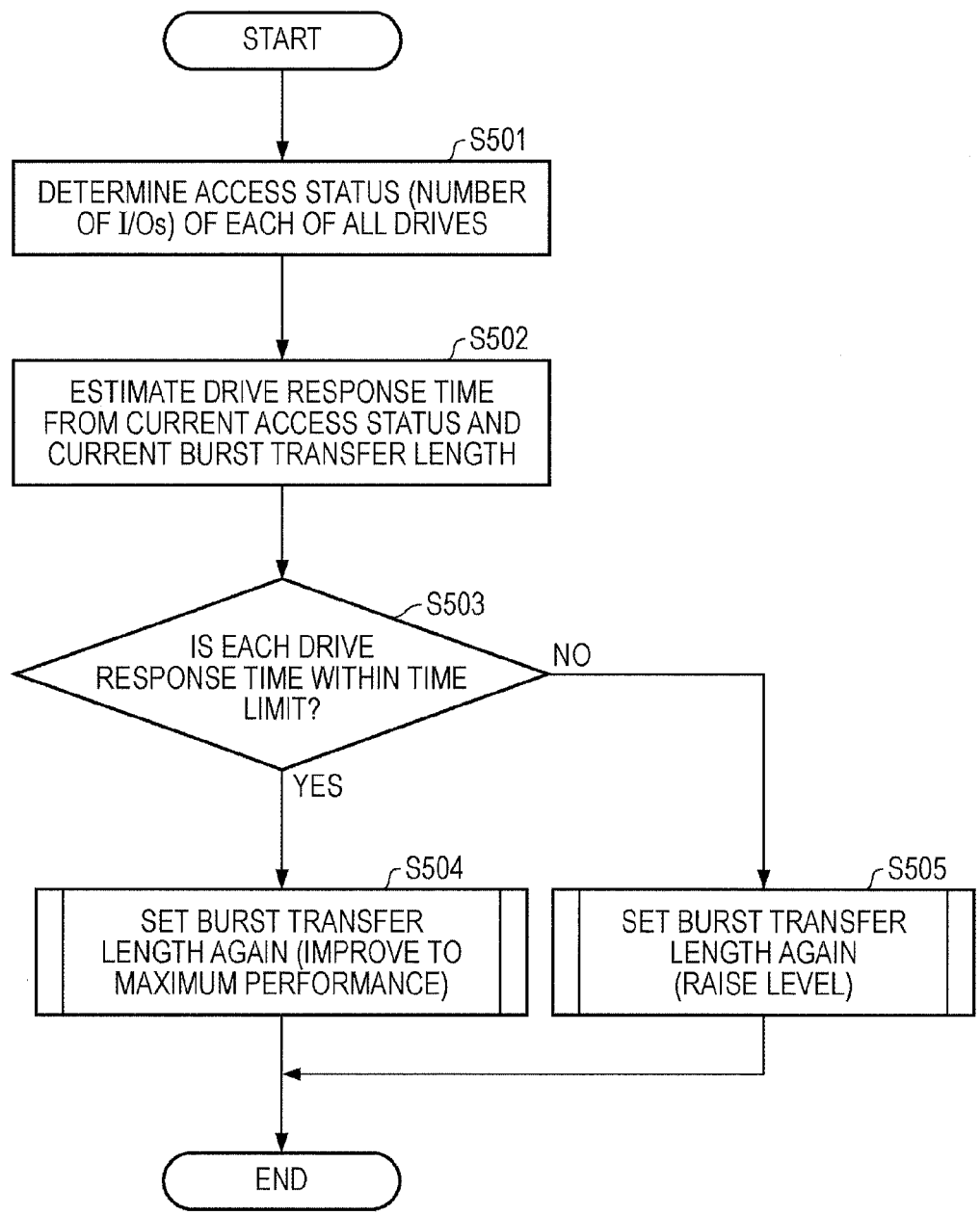
FIG. 11 is a flowchart that illustrates a process (part II) of adjustment of a burst transfer length.

Next, adjustment of a burst transfer length in use is described. FIG. 11 is a flowchart that illustrates a process (part II) of adjustment of a burst transfer length. FIGS. 12A to 12C illustrate burst transfer length management tables. FIG. 12A illustrates a burst transfer length management table that describes a current access status.

To calculate an estimated response time, a computational condition, such as the number of I/Os, type of I/O (write/read), an I/O access method (sequential/random), the length of data of I/O, performance of each storage device, or the number of drives connected on the same bus, may be needed.

If usage in which the access frequency to a storage device varies with the time period is considered, the number of I/Os increases with an increase in the number of accesses, whereas on the other hand the number of I/Os reduces with a reduction in the number of accesses. Accordingly, of the above computational conditions, the number of I/Os is assumed to be the most variable element when the system is in use, and the response time is estimated using the number of I/Os as the computational condition. Setting less variable computational conditions at constants facilitates estimation of the response time.

First, in FIG. 11, the burst transfer length adjusting unit 76 causes the I/O number detection circuit 78 of the burst transfer control circuit 79 to collect a current number of I/Os representing an access status on the path at every given time (S501).

The type of the drive, the current burst transfer length, and the current number of accesses (number of I/Os) from the host detected by the I/O number detection circuit 78 are registered in a burst transfer length management table 191 illustrated in FIG. 12A.

The burst transfer length adjusting unit 76 calculates and estimates the response time from the current number of I/Os and the current burst transfer length of each drive (S502). The burst transfer length adjusting unit 76 determines whether the response time of each drive is within a time limit (S503). If it is within the time limit (YES in S503), the burst transfer length of a drive whose performance is capable of being improved is reset to the one at which the performance is improved to the maximum (S504).

If there is a drive having a response time exceeding the time limit (NO in S503), the burst transfer length of a drive whose performance is capable of being decreased is reset such that the level of that drive is raised (S505). For the present embodiment, an example in which the time limit is 2.0 seconds is described.

FIG. 13 is a flowchart of a process (part III) of adjustment of a burst transfer length. The burst transfer length adjusting unit 76 determines the maximum value of each of the burst transfer lengths of all drives from the burst transfer length management table (S601).

The burst transfer length adjusting unit 76 determines whether the current burst transfer length of each drive is the maximum value (S602). If it is not the maximum value (NO in S602), a drive response time for each of all drives is estimated from the current access status and the maximum burst transfer length (S603). If it is the maximum burst transfer length (YES in S602), the process ends.

If the estimated drive response time is within a time limit (YES in S604), the burst transfer length is determined (S605). If the estimated drive response time exceeds the time limit (NO in S604), the burst transfer length adjusting unit 76 determines whether the burst transfer length of each of all drives is the same as the minimum value of the burst transfer lengths registered in the burst transfer length management table (S606).

If it is the same (YES in S606), the burst transfer length adjusting unit 76 determines the burst transfer length (S605). If it is not the same (NO in S606), the burst transfer length adjusting unit 76 reduces the burst transfer length of a drive having the maximum burst transfer length to that of a drive having the second longest burst transfer length in the burst transfer length management table. Then, the burst transfer length adjusting unit 76 estimates the response time (S607), and the process returns to S604.

FIG. 12B illustrates a burst transfer length management table in which estimated response times are registered. The burst transfer length adjusting unit 76 calculates and estimates a response time from the current number of I/Os and the burst transfer length of each drive. Here, the number of I/Os of each of the drives 1 to 4 is 100, the number of I/Os of each of the drives 5 to 7 is 10, and the number of I/Os of the drive 8 is 5.

If the processing time would be able to be shortened (performance would be able to be improved) by changing the burst transfer length, the burst transfer length adjusting unit 76 changes the burst transfer length of a target drive. If it is estimated that an increase in the burst transfer length would cause no problem, the burst transfer length adjusting unit 76 resets the burst transfer length of the target drive such that it is increased to the estimated value.

The burst transfer length adjusting unit 76 changes the current burst transfer length of the drive 1 from the initial value 64 KB to the maximum value 128 KB, as illustrated in a burst transfer length management table 192. With this, performance optimization is disabled, and normal processing returns. The burst transfer control circuit 79 sets the amount of data to be transferred at a time at 128 KB such that the burst transfer length of the drive 1 in I/O processing is 128 KB. That is, the burst transfer control circuit 79 does not issue a divisional command.

With this, the estimated response time of the drive 1 is 0.75 seconds, that of each of the drives 2 to 4 is 1.5 seconds, and that of each of the drives 5 to 7 is 1.0 second. Accordingly, performance of the drive 1 may be able to be improved in the range where the improvement does not affect the estimated response time of the other drives, and the response speed may be able to be enhanced.

If an estimated response time based on a collected access status exceeds a time limit, the burst transfer length is readjusted such that the access response time of the drive falls within the time limit. That is, the burst transfer length is shortened, and performance of a drive having a low response speed is improved.

Figure 14:
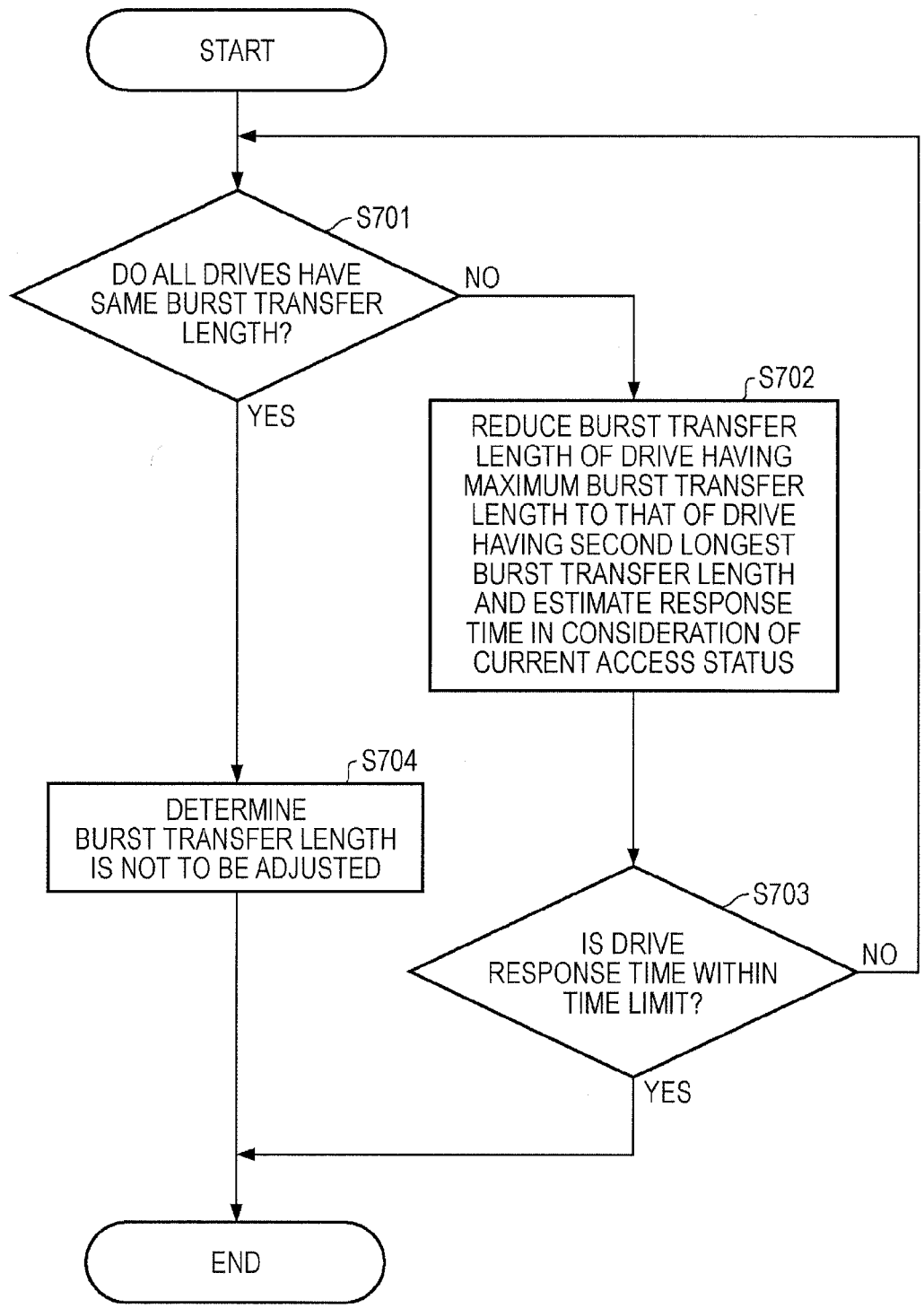
FIG. 14 is a flowchart that illustrates a process (part IV) of adjustment of a burst transfer length.
Figure 15:
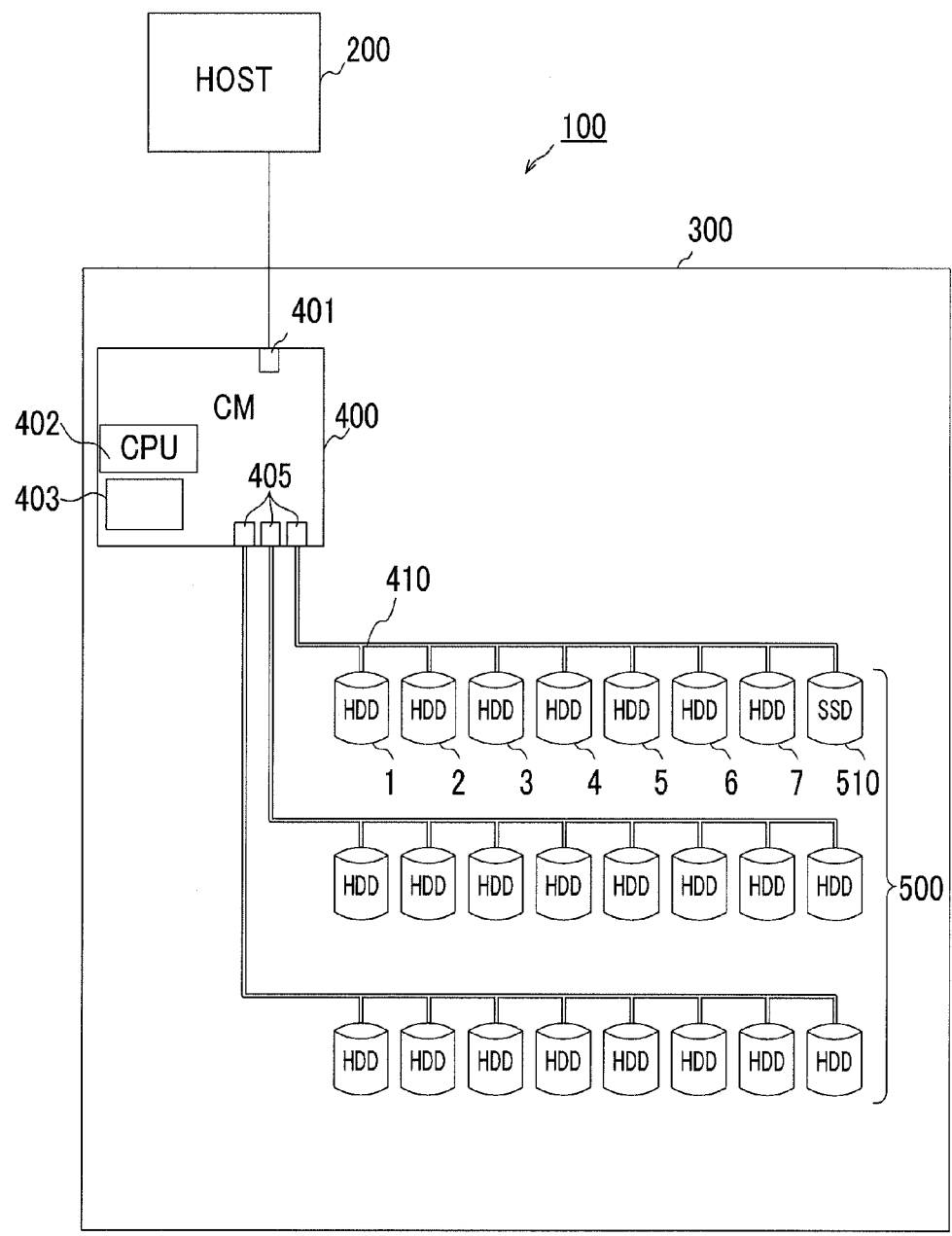
FIG. 15 illustrates a computer system including a storage system.
Figure 16:
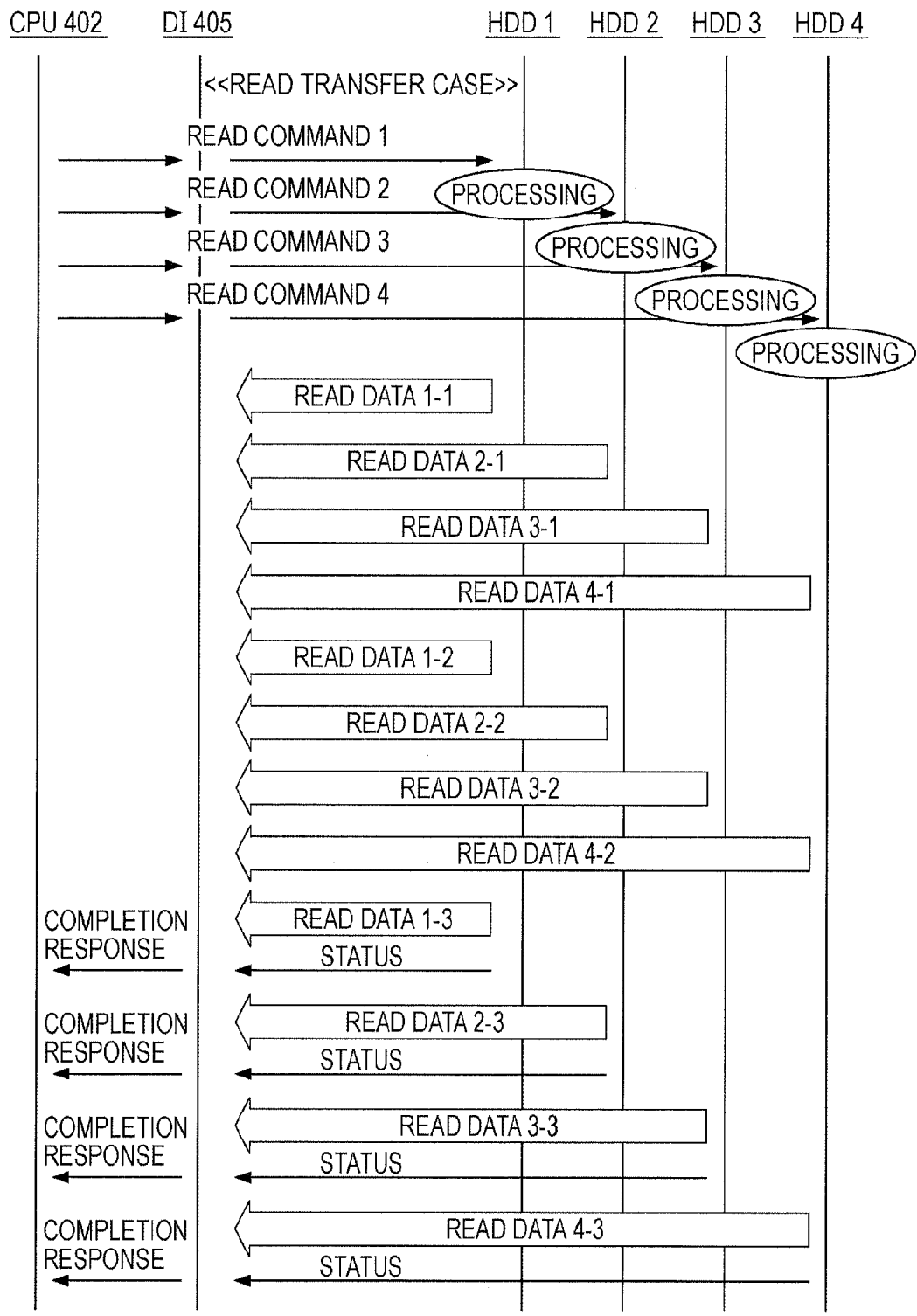
FIG. 16 illustrates how a command from a CPU to an HDD is processed.

FIG. 14 is a flowchart that illustrates a process (part IV) of adjustment of a burst transfer length. The burst transfer length adjusting unit 76 determines whether all drives have the same current burst transfer length (S701). If they have the same current burst transfer length (YES in S701), it is determined that the burst transfer length is not to be adjusted (S704).

If not all drives have the same burst transfer length (NO in S701), the burst transfer length adjusting unit 76 reduces the burst transfer length of a drive having the maximum burst transfer length to that of a drive having the second longest burst transfer length and estimates the response time in consideration of the current access status (S702).

If the response time of the drive is within the time limit (YES in S703), the burst transfer length adjusting unit 76 completes the process. If it exceeds the time limit (NO in S703), the process returns to S701.

FIG. 12C illustrates a burst transfer length management table in which estimated response times are registered. The burst transfer length adjusting unit 76 changes the current burst transfer length 128 KB of the drive 1 such that it is reduced to 64 KB, as illustrated in a burst transfer length management table 193 of FIG. 12C. Here, the number of I/Os of each of the drives 1 to 8 is 100.

The burst transfer control circuit 79 refers to the burst transfer length management table 193 and changes the amount of data to be transferred at a time of the drive 1 in I/O processing. With this, the estimated response time of the drive 1 is 1.0 second, that of each of the drives 2 to 7 is 1.0 second, and that of the drive 8 is 2.0 seconds.

Accordingly, improvement of the response speed by increasing the level of performance of the drive 8, which has the minimum burst transfer length, may be able to prevent degradation of system performance.

Also for the second embodiment, performance optimization illustrated in FIG. 6 and normal processing may be optionally used, as in the case of the first embodiment. That is, if an operation request command has been issued from the host 21 to a drive having a short burst transfer length, the CPU 72 may enable performance optimization of the burst transfer control circuit 79 and issue a divisional command with respect to that operation request command.

For the present embodiment, the CPU 72 detects a burst transfer length and determines whether performance optimization is to be carried out. However, the DI 75 may perform such processing using a processor provided to the DI 75. The burst transfer length management table may be stored in the DI 75 or a memory, such as the cache memory 74.

With a storage control apparatus, a storage system, and a storage control method according to the disclosure, if there are storage devices having different burst transfer lengths on the same bus, degradation of system performance may be able to be prevented by adjustment of the burst transfer length in I/O processing to at least one of storage devices other than a storage device having the minimum burst transfer length in a burst transfer length management table. Accordingly, the reliability of the overall system may be able to be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus for transmitting data to and receiving data from a plurality of storage devices connected to the same interface, the storage control apparatus comprising:
   a memory configured to store a management table registering a burst transfer length of each of the plurality of storage devices, the plurality of storage devices including a first storage device having a first burst transfer length that is a minimum among the burst transfer lengths registered in the management table and a second device having a second burst transfer length;
   an adjusting controller configured to adjust the second burst transfer length in input and/or output processing to the second storage device if the second burst transfer length registered in the management table is different from the first burst transfer length registered in the management table; and
   a data transfer controller configured to issue a command for a data transfer to the second storage device on the basis of the second burst transfer length adjusted by the adjusting controller.

2. The storage control apparatus according to claim 1, wherein the data transfer controller is configured to divide the command to the second storage device into a plurality of commands corresponding to the adjusted second burst transfer length and issue the plurality of commands to the second storage device.

3. The storage control apparatus according to claim 1, further comprising:
   a detector configured to detect the burst transfer length of each of the plurality of storage devices in input and/or output processing, the burst transfer lengths detected by the detector being registered in the management table,
   wherein the second storage device includes the plurality of storage devices other than the first storage device, the adjusting controller is configured to adjust the burst transfer length of each of the plurality of storage devices other than the first storage device in input and/or output processing so as to equal to the first burst transfer length in the management table.

4. The storage control apparatus according to claim 2, further comprising:
   a detector configured to detect the burst transfer length of each of the plurality of storage devices in input and/or output processing, the burst transfer lengths detected by the detector being registered in the management table,
   wherein the second storage device includes the plurality of storage devices other than the first storage device, the adjusting controller is configured to adjust the burst transfer length of each of the plurality of storage devices other than the first storage device in input and/or output processing so as to equal to the first burst transfer length in the management table.

5. The storage control apparatus according to claim 1, wherein the second burst transfer length of the second storage device is a maximum among the burst transfer lengths registered in the management table, the adjusting controller is configured to estimate a response time when a load is applied to each of the plurality of storage devices and, if there is a storage device having an estimated response time exceeding a time limit, adjust the second burst transfer length in input and/or output processing to the second storage device.

6. The storage control apparatus according to claim 2, wherein the second burst transfer length of the second storage device is a maximum among the burst transfer lengths registered in the management table, the adjusting controller is configured to estimate a response time when a load is applied to each of the plurality of storage devices and, if there is a storage device having an estimated response time exceeding a time limit, adjust the second burst transfer length in input and/or output processing to the second storage device.

7. The storage control apparatus according to claim 5, wherein, if a response time of each of the plurality of storage devices is estimated to be within a time limit, the adjusting controller is configured to set the second burst transfer length registered in the management table as the second burst transfer length in input and/or output processing.

8. A storage system for receiving a host command from a host, the storage system comprising:
a plurality of storage devices connected to the same interface; and
a storage control apparatus for transmitting data to and receiving data from the plurality of storage devices, the storage control apparatus including:
a memory configured to store a management table registering a burst transfer length of each of the plurality of storage devices, the plurality of storage devices including a first storage device having a first burst transfer length that is a minimum among the burst transfer lengths registered in the management table and a second device having a second burst transfer length;
an adjusting controller configured to adjust the second burst transfer length in input and/or output processing to the second storage device if the second burst transfer length registered in the management table is different from the first burst transfer length registered in the management table; and
a data transfer controller configured to issue a command for a data transfer to the second storage device on the basis of the second burst transfer length adjusted by the adjusting controller.

9. The storage system according to claim 8, wherein the data transfer controller is configured to divide the command to the second storage device into a plurality of commands corresponding to the adjusted second burst transfer length and issue the plurality of commands to the second storage device.

10. The storage system according to claim 8, further comprising:
a detector configured to detect the burst transfer length of each of the plurality of storage devices in input and/or output processing, the burst transfer lengths detected by the detector being registered in the management table,
wherein the second storage device includes the plurality of storage devices other than the first storage device, the adjusting controller is configured to adjust the burst transfer length of each of the plurality of storage devices other than the first storage device in input and/or output processing so as to equal to the first burst transfer length in the management table.

11. The storage system according to claim 9, further comprising:
a detector configured to detect the burst transfer length of each of the plurality of storage devices in input and/or output processing, the burst transfer lengths detected by the detector being registered in the management table,
wherein the second storage device includes the plurality of storage devices other than the first storage device, the adjusting controller is configured to adjust the burst transfer length of each of the plurality of storage devices other than the first storage device in input and/or output processing so as to equal to the first burst transfer length in the management table.

12. The storage system according to claim 8, wherein the second burst transfer length of the second storage device is a maximum among the burst transfer lengths registered in the management table, the adjusting controller is configured to estimate a response time when a load is applied to each of the plurality of storage devices and, if there is a storage device having an estimated response time exceeding a time limit, adjust the second burst transfer length in input and/or output processing to the second storage device.

13. The storage system according to claim 9, wherein the second burst transfer length of the second storage device is a maximum among the burst transfer lengths registered in the management table, the adjusting controller is configured to estimate a response time when a load is applied to each of the plurality of storage devices and, if there is a storage device having an estimated response time exceeding a time limit, adjust the second burst transfer length in input and/or output processing to the second storage device.

14. The storage system according to claim 12, wherein, if a response time of each of the plurality of storage devices is estimated to be within a time limit, the adjusting controller is configured to set the second burst transfer length registered in the management table as the second burst transfer length in input and/or output processing.

15. A storage control method for transmitting data to and receiving data from a plurality of storage devices connected to the same interface, the storage control method comprising:
obtaining a management table registering a burst transfer length of each of the plurality of storage devices, the plurality of storage devices including a first storage device having a first burst transfer length that is a minimum among the burst transfer lengths registered in the management table and a second device having a second burst transfer length;
adjusting the second burst transfer length in input and/or output processing to the second storage device if the second burst transfer length registered in the management table is different from the first burst transfer length registered in the management table; and
issuing a command for a data transfer to the second storage device on the basis of the adjusted second burst transfer length.

16. The storage control method according to claim 15, wherein the issuing including dividing the command to the second storage device into a plurality of commands corresponding to the adjusted second burst transfer length and issuing the plurality of commands to the second storage device.

17. The storage control method according to claim 15, further comprising:
  detecting the burst transfer length of each of the plurality of storage devices in input and/or output processing;
  registering the detected burst transfer lengths in the management table:
  wherein the second storage device includes the plurality of storage devices other than the first storage device, the adjusting includes adjusting the burst transfer length of each of the plurality of storage devices other than the first storage device in input and/or output processing so as to equal to the first burst transfer length in the management table.

18. The storage control method according to claim 16, further comprising:
  detecting the burst transfer length of each of the plurality of storage devices in input and/or output processing;
  registering the detected burst transfer lengths in the management table:
  wherein the second storage device includes the plurality of storage devices other than the first storage device, the adjusting includes adjusting the burst transfer length of each of the plurality of storage devices other than the first storage device in input and/or output processing so as to equal to the first burst transfer length in the management table.

19. The storage control method according to claim 15, wherein the second burst transfer length of the second storage device is a maximum among the burst transfer lengths registered in the management table, the adjusting includes estimating a response time when a load is applied to each of the plurality of storage devices and, if there is a storage device having an estimated response time exceeding a time limit, adjusting the second burst transfer length in input and/or output processing to the second storage device.

20. The storage control method according to claim 16, wherein the second burst transfer length of the second storage device is a maximum among the burst transfer lengths registered in the management table, the adjusting includes estimating a response time when a load is applied to each of the plurality of storage devices and, if there is a storage device having an estimated response time exceeding a time limit, adjusting the second burst transfer length in input and/or output processing to the second storage device.

* * * * *